United States Patent [19]

Thibodeaux

[11] Patent Number: 5,055,085
[45] Date of Patent: Oct. 8, 1991

[54] CRAWFISH PEELING APPARATUS

[76] Inventor: Glenn Thibodeaux, Rt. 3 Box 75A, Church Point, La. 70525

[21] Appl. No.: 560,135

[22] Filed: Jul. 31, 1990

[51] Int. Cl.$^5$ .............................................. A22C 29/02
[52] U.S. Cl. ............................................ 452/5; 452/1
[58] Field of Search ............... 17/73, 48, 51; 452/5, 452/1

[56] References Cited

U.S. PATENT DOCUMENTS

| | | | |
|---|---|---|---|
| 3,221,363 | 12/1965 | Couret | 17/73 |
| 3,758,921 | 9/1973 | Ingalls | 17/73 |
| 4,912,810 | 4/1990 | Laughlin et al. | 17/73 |

Primary Examiner—Willis Little
Attorney, Agent, or Firm—Pravel, Gambrell, Hewitt, Kimball & Krieger

[57] ABSTRACT

A crawfish peeling apparatus uses fluid under pressure flowing through a tool body to a lance that punctures the crawfish exoskeleton. Fluid exits the tool body at the lance and travels into the crawfish exoskeleton at the lance and forces the tail meat from the exoskeleton tail portion.

20 Claims, 4 Drawing Sheets

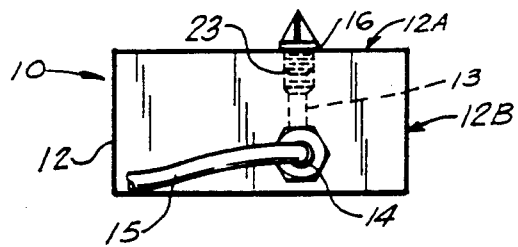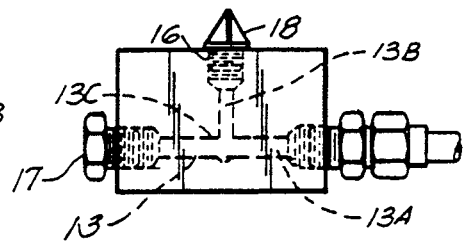
FIG. 1  FIG. 2
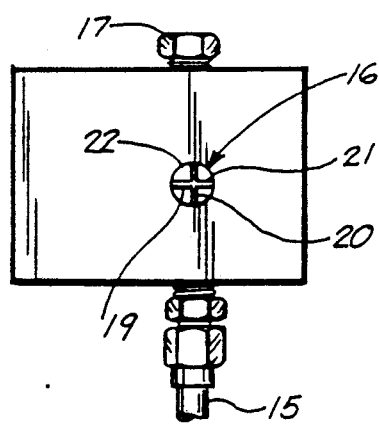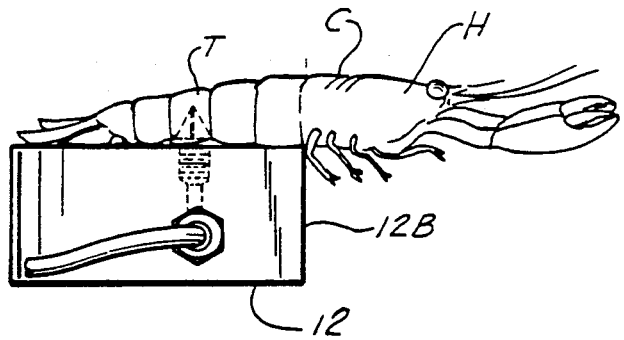
FIG. 3  FIG. 4
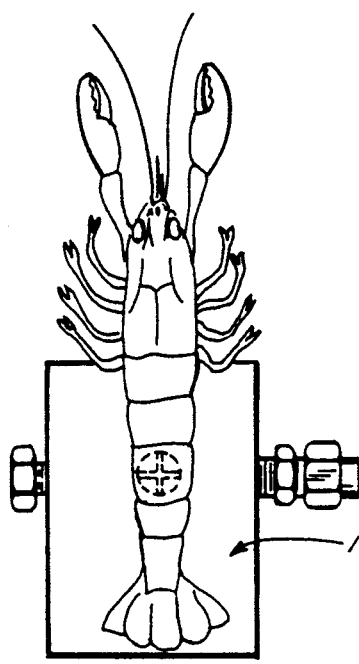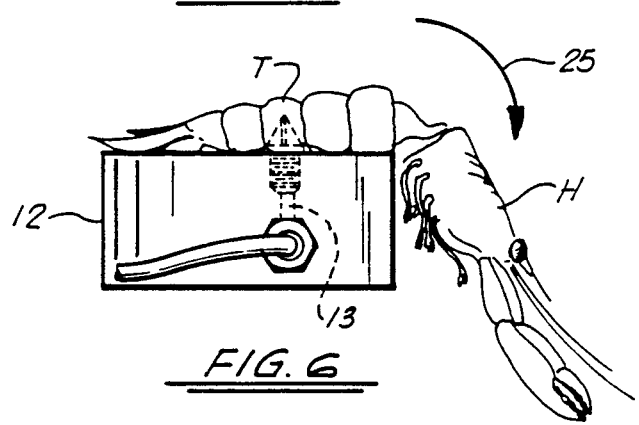
FIG. 6
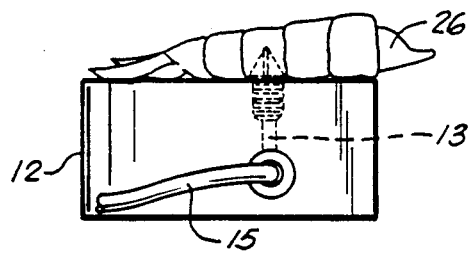
FIG. 7
FIG. 5
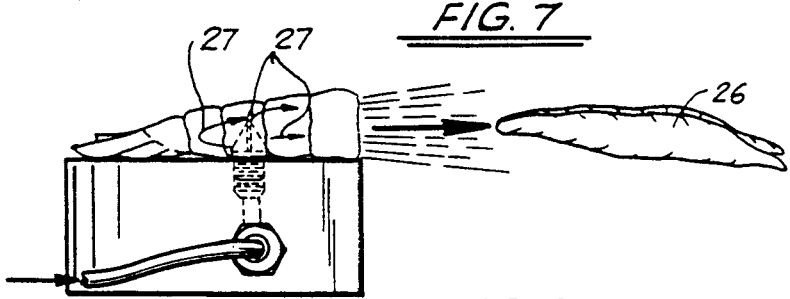
FIG. 8

U.S. Patent     Oct. 8, 1991     Sheet 2 of 4     5,055,085
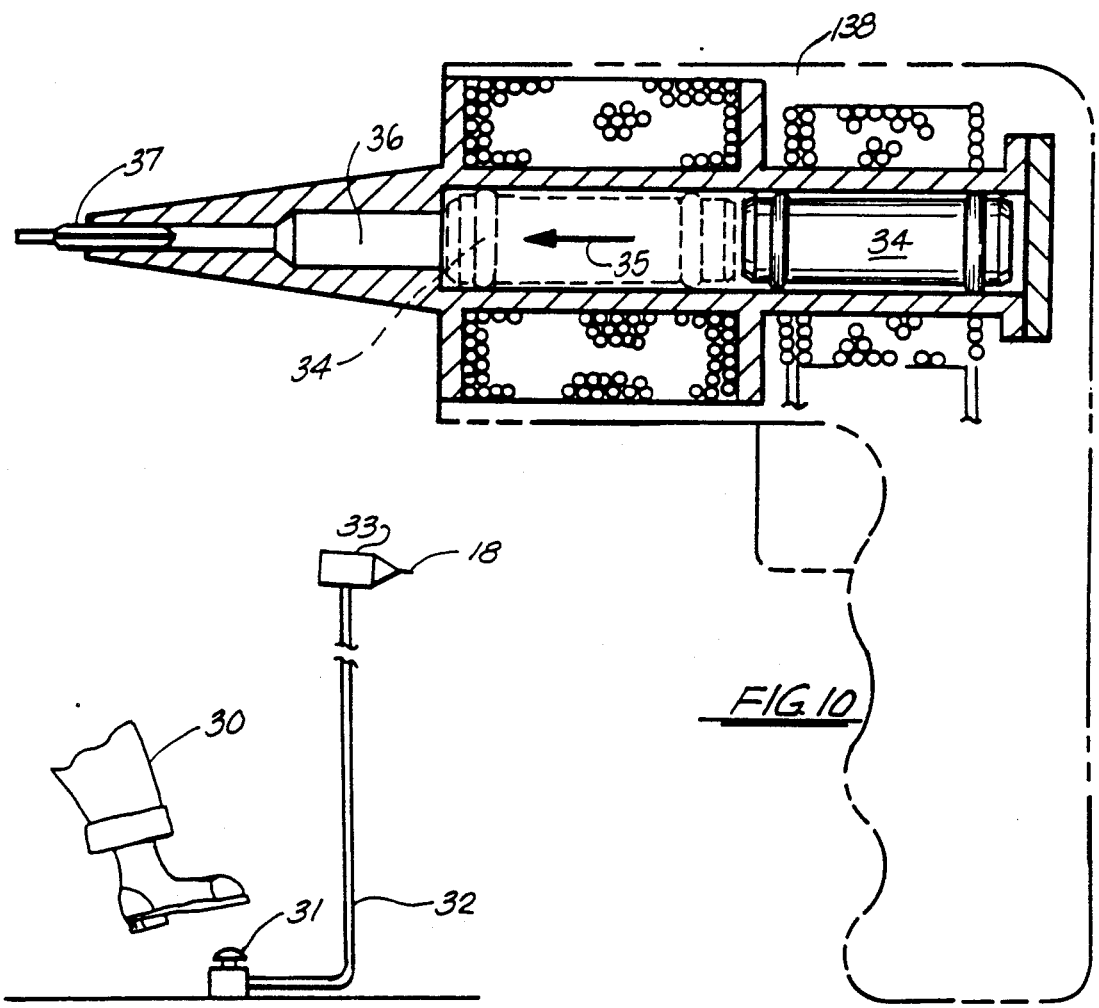
FIG. 10
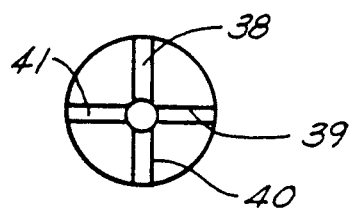
FIG. 9
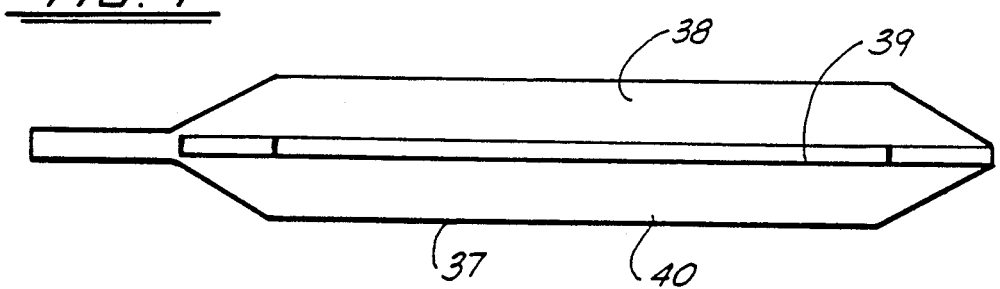
FIG. 11
FIG. 12

CRAWFISH PEELING APPARATUS

BACKGROUND OF THE INVENTION

1. Field of the Invention

The present invention relates to peeling devices for use in removing the tail meat from a crustacean such as a crawfish wherein a lance penetrates the exoskeleton and fluid under pressure flows from a tool body through the lance into the crawfish exoskeleton interior, forcing the meat therefrom and wherein the lance has a conduit for channeling fluid under pressure from the tool body to the interior of the crawfish exoskeleton while the lance occupies a position at the aperture in the exoskeleton.

2. General Background

A small crustacean which is very popular in the southeastern and some parts of the southwest United States known as the crawfish is used in many food delicacies such as crawfish bisque, crawfish etouffe, crawfish stew, fried crawfish tails and many others. In the metropolitan cities of New Orleans, La. and Houston, Tex. as well as all of the surrounding communities, these crawfish dishes have become immensely popular.

Crawfish are becoming an ever growing popular food item in other parts of the United States as well as in foreign markets. The crawfish appears in pictures and in photographs to resemble a lobster. However, it is a much different animal, being many many times smaller. Thus, the hand peeling method typically associated with lobsters becomes very time consuming and labor intensive when applied to crawfish because the yield is so small for the time invested. For this reason, crawfish have continued to be very expensive when commercialized in processed, picked form which necessarily is by hand. This hampers the industry of crawfish farming, raises prices to the consumer, and generally stifles the growth of the crawfish farming industry.

Several devices have been patented which have attempted to solve the problem of picking or peeling the exoskeleton of a crawfish in order to harvest the tail meat portion which is the only sizable meat product in the crawfish worth commercializing. The claws are on the order of one half inch ($\frac{1}{2}$") long and contain very little meat product, a minuscule amount if commercialization is required.

The following list of patents relates to devices for peeling crawfish and other crustacea, some of which employ air under pressure as part of the peeling process.

| U.S. PAT. NO. | TITLE | ISSUE DATE |
| --- | --- | --- |
| 2,660,754 | Crayfish Picking Machine | 12/01/53 |
| 3,221,363 | Process for Removing the Edible Meats From Crustacea Tails | 12/07/65 |
| 3,758,921 | Crawfish Peeler | 09/18/73 |
| 3,871,086 | Apparatus for De-Shelling Crustaceans | 03/18/75 |
| 4,121,322 | Crustacean Meat Extraction Means | 10/24/78 |
| 4,196,495 | Crawfish Tail Peeler | 04/08/80 |
| 4,385,422 | Crayfish Peeler | 05/31/83 |

These above devices are all relatively complicated requiring extensive machinery and the maintenance and downtime as well as expense that is associated with such complicated machinery.

The present invention provides a simple yet highly efficient method and apparatus for peeling crawfish wherein a tool body having a fluid conveying bore is used to route fluid under pressure through a lance into the crawfish exoskeleton so that the meat product is literally thrown from the exoskeleton in a projectile fashion.

SUMMARY OF THE PRESENT INVENTION

The present invention thus provides a crawfish peeling apparatus for separating the tail meat from the crawfish exoskeleton by providing a tool body having a fluid conveying bore and a fluid inlet connecting with the tool bore for connecting a source of fluid under pressure to the tool body. A fluid outlet communicates with the bore for discharging fluid under pressure from the tool body. A lance, positioned at the fluid outlet, in fluid communication therewith is provided for penetrating the crawfish exoskeleton to form an aperture in the exoskeleton. The lance includes a conduit for channeling fluid under pressure from the tool body to the interior of the crawfish exoskeleton while the lance occupies a position at the aperture formed by the lance in the exoskeleton.

In the preferred embodiment, the tool body includes intersecting surfaces which allow a worker to break the crawfish in half, tearing the head portion away from the tail portion so that the tail meat is thrown clear of the head portion of the crawfish upon injection of air.

In one embodiment, the apparatus provides a hand held "gun" which can be used to manually force the lance into the crawfish body. Another embodiment uses a foot operated apparatus having a burst of compressed air supplied to the crawfish exoskeleton when the apparatus is depressed using the foot of a worker.

In another embodiment, self-contained pressurized fluid can be used as part of a throw away disposable crawfish peeling device for home use or for demonstration purposes.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 represents a side view of the preferred embodiment of the apparatus of the present invention;

FIG. 2 is an end view of the preferred embodiment of the apparatus of the present invention;

FIG. 3 is the top view of the preferred embodiment of the apparatus of the present invention;

FIG. 4 is a side view of the preferred embodiment of the apparatus of the present invention illustrating penetration of the lance into the crawfish exoskeleton;

FIG. 5 is a top view of the preferred embodiment of the apparatus of the present invention showing the crawfish body positioned upon the tool body and wherein the lance has penetrated the crawfish exoskeleton.

FIG. 6 is another side view illustrating removal of the head portion of the crawfish body from the tail section prior to an injection of fluid under pressure into the crawfish exoskeleton;

FIGS. 7 & 8 are sequential views illustrating the method of removing the tail meat from the crawfish exoskeleton;

FIG. 9 is a side schematic view of an alternate embodiment of the apparatus of the present invention;

FIG. 10 is a side schematic view of a third embodiment of the apparatus of the present invention;

FIG. 11 is a fragmentary view of the lance portion of the preferred embodiment of the apparatus of the present invention;

FIG. 12 is a sectional view of the lance of FIG. 11;

DETAILED DESCRIPTION OF THE PREFERRED EMBODIMENT

Figure 13:
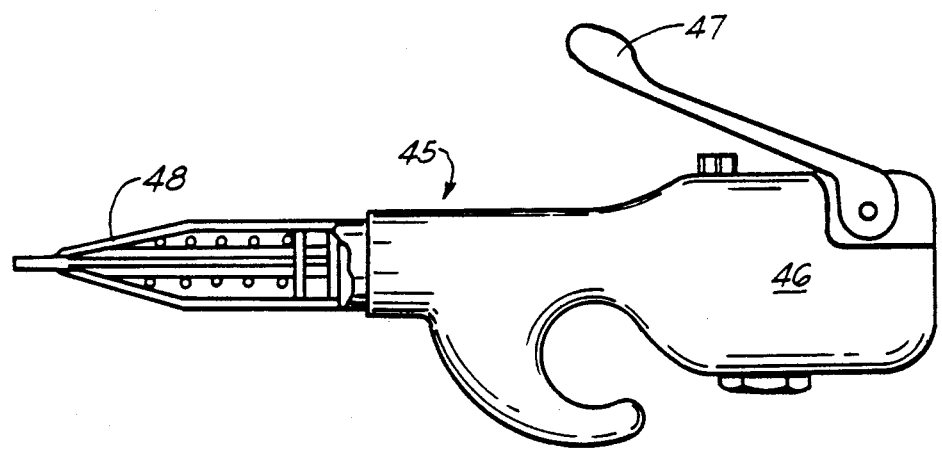
FIG. 13 is a side schematic view of a fourth embodiment of the apparatus of the present invention.

FIGS. 1-8 illustrate the preferred embodiment of the apparatus of the present invention designated generally by the numeral 10.

Crawfish peeling apparatus 10 includes a tool body 12 having a fluid conveying bore 13 connected to a fluid inlet 14 for connecting the bore 13 to a source 15 of fluid under pressure such as for example an accumulator, a canister of fluid under pressure or the like. A fluid outlet 16 communicates with bore 13 and is provided for discharging fluid under pressure from tool body 12. In FIG. 2, bore 13 can be seen in section as a generally T-shaped bore having three legs 13A-13C. The leg 13C is simply a clean out section of the bore so that when plug 17 is removed, the bore can be cleaned by swabbing for example. Lance 18 occupies a position in tool body at outlet 16. Lance 18 is preferably conical in shape as shown in FIG. 2, but has a generally crossed or X-shaped cross section as shown in FIG. 3, defined by a plurality of flanges 19-22. Otherwise, lance 18 is hollowed so that air or fluid under pressure can flow from bore 13 to the exterior of tool body 12 by flowing along the sides of each of the flanges 19-22 and within the circular space defined (FIG. 3) by the fluid outlet opening 16.

The lance is positioned at the fluid outlet and can be in the form of a circular threaded fitting having a hollowed bore that is open ended, and one end of the fitting 23 carrying the flanges 19-22.

In FIG. 4, the crawfish body C can be seen as including a head portion H and a tail portion T. In the preferred embodiment, the tool body 12 is generally rectangular providing a pair of angularly intersecting work surfaces 12A, 12B which intersect at approximately 90 degrees with respect to one another. A worker simply holds the tail T against the surface 12A and then bends the head section H downwardly as shown by the curved arrow 25 in FIG. 6 breaking the crawfish body C in half so that the tail meat 26 is exposed as shown in FIG. 7. The lance has penetrated the underside of the tail exoskeleton as shown in FIGS. 4, 6, and 7. Air is injected into the crawfish exoskeleton as shown by the arrows 27 in FIG. 8 which forces the tail meat 26 outwardly as shown in FIG. 8. The generally conical shape of the lance 18 and the flanges 19-22 prevent the tail meat from clogging the air passages adjacent each of the flanges 19-22.

In the embodiment of FIG. 9, the foot 30 of a user depresses a foot pedal 31 which communicates with an elongated flow conveying pipe 32 that communicates with tool body 33. The tool body 33 would provide lance 18 so that when foot pedal 31 was depressed, a burst of air flows through the lance 18 into the crawfish exoskeleton. In the embodiment of FIG. 10, a shifting solenoid 34 moves in the direction shown by the arrow 35 to force a measured amount of air via duct 36 to lance 37. Thus, the volume of air dispensed with each actuation of the solenoid 34 is defined by the chamber in which the solenoid travels, that volume being shown in phantom lines as the final position of the solenoid 34 in FIG. 10.

In FIG. 11, the lance 37 is illustrated as being an elongated structure mounted at the distal end of conduit 36 of the tool body 138. The lance 37 includes a plurality of preferably four flanges 38-41 as shown in FIG. 12.

Figure 14:
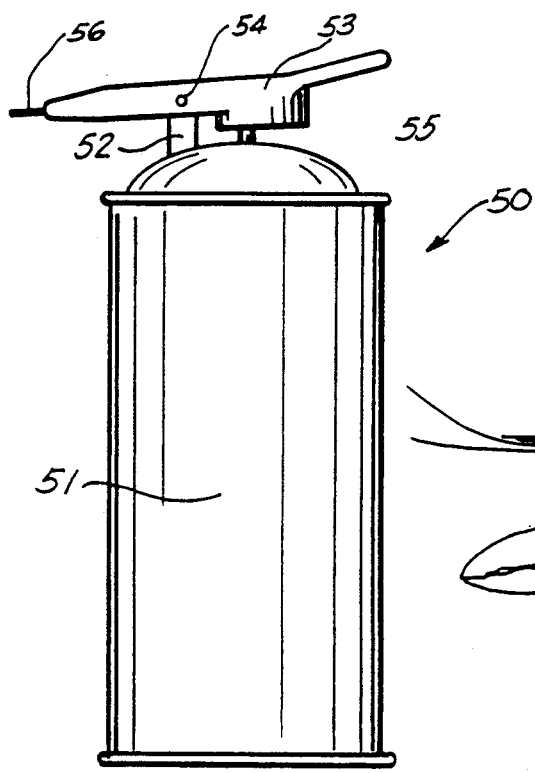
FIG. 14 is a schematic view of another embodiment of the apparatus of the present invention.
Figure 15A:
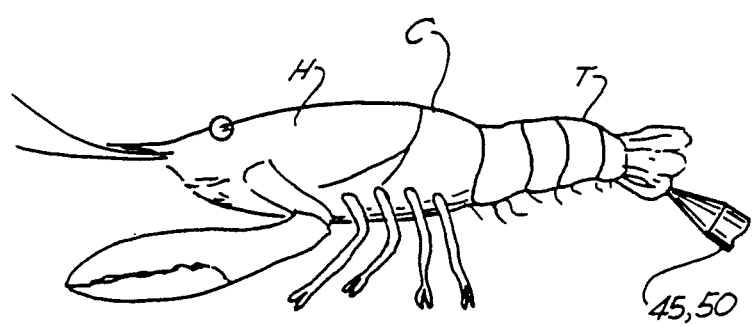
FIGS. 15A-15B are sequential views illustrating the method of the present invention with one of the hand held embodiments of the apparatus of the present invention.
Figure 15B:
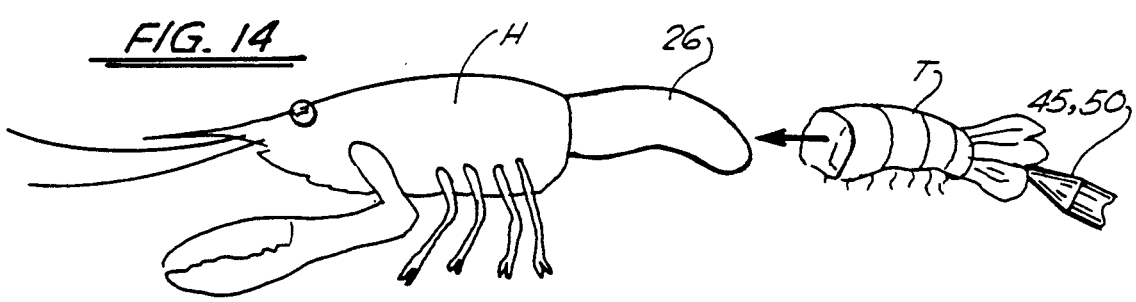

FIGS. 13 and 14 show other embodiments of the apparatus of the present invention designated generally by the numerals 45 and 50 respectively. In FIG. 13, the apparatus 45 includes a tool body 46 which could be attached to an air compressor, providing a lever 47 for intermittently dispensing air via a longitudinally extending flow bore to lance 48 which would be similar in construction and configuration to the embodiment of FIG. 11. In FIG. 14, canister apparatus 50 includes a pressurized container 51 of compressed air for example having an upstanding pivot post 52 to which operator 53 is pivotally attached at 54. A conduit or flow bore extends from the interior of container 51 via duct 55 to lance 56 which would be of similar construction to the lance shown in FIG. 11. In FIGS. 15A and 15B, the use of a hand held or foot actuated apparatus as shown in FIGS. 9-14 is illustrated, as the crawfish C would be simply hand held by a user or placed on a flat surface such as a table and the exoskeleton would be penetrated using the lance portion of the apparatus so that air injected into the interior of the crawfish tail exoskeleton forces the tail meat 26 from the tail exoskeleton. However, with the embodiments of FIGS. 9-15, the head H section of the crawfish body is not preliminarily removed by bending as shown in FIGS. 1-8. However, a user could hand remove the head H portion of the crawfish if desired and then remove the tail meat 26 from the tail exoskeleton T if desired using the embodiments 45 or 50.

Figure 17:
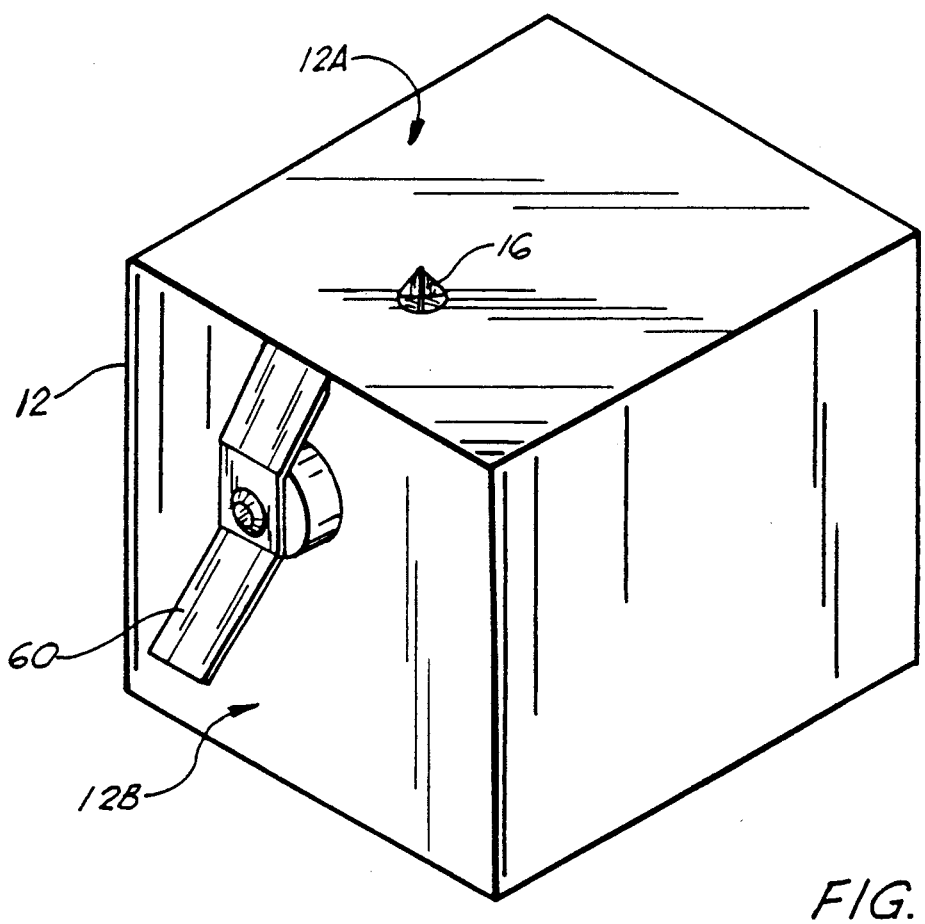
FIG. 17 is a perspective view of the embodiment of FIG. 16.
Figure 16:
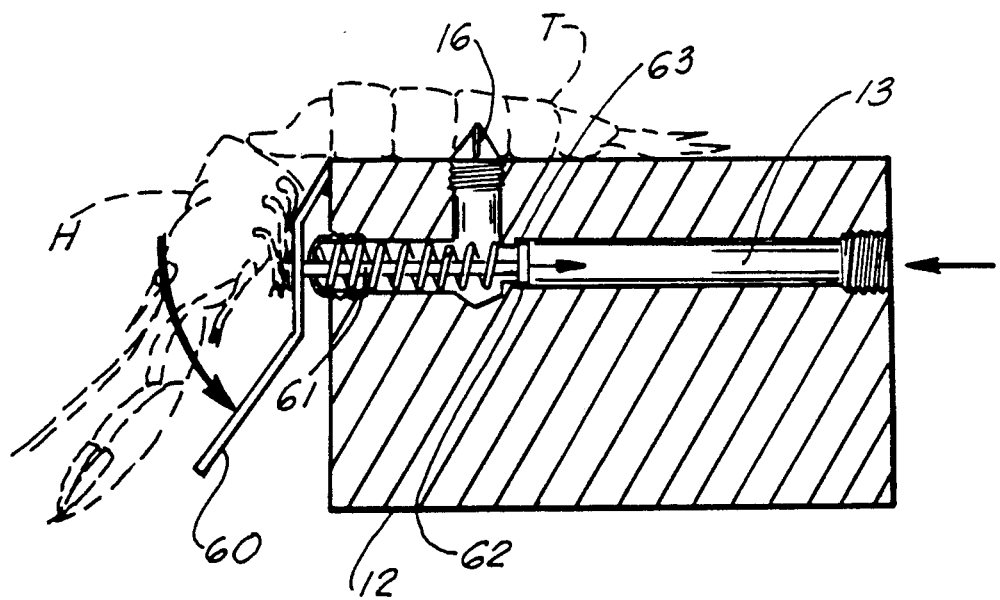
FIG. 16 is a sectional view of a fifth embodiment of the apparatus of the present invention.

FIG. 16 and 17 show a fifth embodiment wherein a flap switch 60 is movably mounted with respect to body 12. Switch 60 depresses pushrod 61 and valving member 62 connected thereto to open port 63 so that bore 13 is opened, allowing a source of pressurized air to communicate with lance 16. Thus, when a crawfish body is folded in half as shown in FIG. 16, air is automatically injected into the tail T via lance 16.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A crawfish peeling apparatus for separating tail meat from the crawfish exoskeleton comprising:

a) a tool body having a fluid conveying bore;
b) fluid inlet means for communicating with the bore for connecting a source of fluid under pressure to the tool body;
c) fluid outlet means bore communicating with the bore for discharging fluid under pressure from the tool body;
d) lance means, positioned at the fluid outlet means in fluid communication therewith for penetrating the crawfish exoskeleton to form an aperture in said exoskeleton;
e) the lance means having conduit means for channelling fluid under pressure from the tool body to the interior of the crawfish exoskeleton while the lance means occupies a position at the aperture formed in the exoskeleton; and
f) switch means, for controlling flow of fluid to the lance, comprising means for depressing the switch means with a crawfish body when a crawfish body is placed on the tool body.

2. The apparatus of claim 1 wherein the lance means comprises at least a pair of intersecting flange members having inclined surface portions that extend above the tool body.

3. The apparatus of claim 1 wherein the lance means comprises a pointed portion that extends beyond the tool body at the fluid outlet means.

4. The apparatus of claim 1 wherein the lance means comprises a lance having a tip portion that is adapted to penetrate the crawfish exoskeleton, and a fluid passage portion that allows fluid to flow from the bore to the tip portion.

5. The apparatus of claim 1 wherein the tool body has a pair of generally flat surfaces that intersect each other to form a generally right angle.

6. A crawfish peeling apparatus for separating tail meat from the crawfish exoskeleton comprising:
a) a source of pressurized fluid;
b) lance means, in fluid communication with the source of pressurized fluid, comprising means for forming an aperture in a crawfish exoskeleton and multiple fluid flow passages for directing fluid from the source of pressurized fluid to the interior of the crawfish exoskeleton.

7. The apparatus of claim 6 wherein the lance means comprises at least a pair of intersecting flange members having inclined surface portions.

8. The apparatus of claim 6 wherein the lance means comprises a pointed portion.

9. The apparatus of claim 6 wherein the lance means comprises a lance having a tip portion that is adapted to penetrate the crawfish exoskeleton, and a fluid passage portion.

10. The apparatus of claim 6 further comprising switch means for controlling the flow of fluid to the lance.

11. The apparatus of claim 10 wherein the switch means includes a manually activated switch portion.

12. The apparatus of claim 6 further comprising a tool body having a pair of generally flat surfaces that intersect each other to form a generally right angle.

13. The apparatus of claim 12 further comprising switch means comprising means for depressing the switch means with a crawfish body when a crawfish body is placed on the tool body.

14. The apparatus of claim 6, wherein the source of pressurized fluid comprises a canister.

15. The apparatus of claim 6, wherein the lance means comprises a conical portion.

16. The apparatus of claim 6, wherein the lance means has a generally X-shaped cross section.

17. The apparatus of claim 16, wherein the lance means comprises a conical portion.

18. The apparatus of claim 16, wherein the lance means is elongated.

19. A crawfish peeling apparatus for separating tail meat from the crawfish exoskeleton comprising:
a) a tool body having a fluid conveying bore;
b) fluid inlet means for communicating with the bore for connecting a source of fluid under pressure to the tool body;
c) fluid outlet means bore communicating with the bore for discharging fluid under pressure from the tool body;
d) lance means, positioned at the fluid outlet means in fluid communication therewith for penetrating the crawfish exoskeleton to form an aperture in said exoskeleton;
e) the lance means having conduit means for channelling fluid under pressure from the tool body to the interior of the crawfish exoskeleton while the lance means occupies a position at the aperture formed in the exoskeleton,
wherein the lance means comprises at least a pair of intersecting flange members having inclined surface portions that extend above the tool body.

20. The apparatus of claim 19 wherein the lance means comprises a pointed portion that extends beyond the tool body at the fluid outlet means.

* * * * *